United States Patent [19]

Anderson et al.

[11] Patent Number: 5,096,745
[45] Date of Patent: Mar. 17, 1992

[54] PREPARATION OF TITANIUM OXIDE CERAMIC MEMBRANES

[75] Inventors: Marc A. Anderson; Qunyin Xu, both of Madison, Wis.

[73] Assignee: Wisconsin Alumni Research Foundation, Madison, Wis.

[21] Appl. No.: 561,491

[22] Filed: Aug. 1, 1990

Related U.S. Application Data

[63] Continuation of Ser. No. 223,795, Jul. 25, 1988, abandoned, which is a continuation-in-part of Ser. No. 77,799, Jul. 27, 1987, abandoned.

[51] Int. Cl.$^5$ ............................................. C04B 33/32
[52] U.S. Cl. ................................... 427/226; 264/43; 264/56; 501/12
[58] Field of Search ............... 264/56, 43; 501/12; 427/226

[56] References Cited

U.S. PATENT DOCUMENTS

| | | | |
|---|---|---|---|
| 4,584,280 | 4/1986 | Nanao et al. | 501/12 |
| 4,800,051 | 1/1989 | Yan | 501/12 |
| 4,801,399 | 1/1989 | Clark et al. | 501/12 |

OTHER PUBLICATIONS

Asaeda et al., "Separation of Alcohol/Water Gaseous Mixtures by Thin Ceramic Membranes," *Jour. of Chem. Eng. Japan*, 19:1, pp. 72-77 (1986).
Johnson, "Sol-Gel Processing of Ceramics and Glass," *Ceramic Bulletin*, 64:12, pp. 1592-1602 (1985).
Leenars et al., "The Preparation and Characterization of Alumina Membranes with Ultra-Fine Pores," *Jour. of Membrane Science*, 24, pp. 261-270 (1985).
Kamiya et al., "Preparation of $TiO_2$ Fibres by Hydrolysis and Polycondensation of $Ti(O-i-C_3H_7)_4$," *Jour. of Mat. Sci. Letters*, 5, pp. 402-404 (1986).
Norton Company, Brochure on Ceraflo TM microfilters.
Sakka, "Gel Method for Making Glass, Treatise on Materials Science and Technology", vol. 22, 1982, pp. 129-182.
Yoko et al., "Photoelectrochemical Properties of $TiO_2$ Films Prepared by the Sol-Gel Method," *Yogyo-Kyokai-Shi*, 95:2, pp. 12-17 (1987).
Yoldas, "A Transparent Porous Alumina", *Ceramic Bulletin*, 54:3, pp. 286-289 (1975).
Yoldas, "Alumina Sol Preparation for Alkoxides," *Ceramic Bulletin*, 51:3, pp. 289-290 (1975).
Yoldas, "Preparation of Glasses and Ceramics from Metal-Organic Compounds", 12:6, pp. 1203-1208 (1977).

*Primary Examiner*—James Derrington
*Attorney, Agent, or Firm*—Quarles & Brady

[57] ABSTRACT

A procedure is disclosed for the reliable production of either particulate or polymeric titanium ceramic membranes by a highly constrained sol-gel procedure. The critical constraints in the procedure include the choice of alkyl alcohol solvent, the amount of water and its rate of addition, the pH of the solution during hydrolysis, and the limit of sintering temperature applied to the resulting gels.

15 Claims, No Drawings

PREPARATION OF TITANIUM OXIDE CERAMIC MEMBRANES

This invention was made with United States government support awarded by the Environmental Protection Agency (EPA), Grant Number: R813457-01-0 and the Department of Energy, Grant Number: DE-AS07-86ID12626. The United States Government has certain rights in this invention.

CROSS REFERENCE TO RELATED APPLICATION

This application is a continuation of application Ser. No. 07/223,795, filed July 25, 1988, now abandoned, which is a continuation-in-part of U.S. patent application Ser. No. 077,799 filed July 27, 1987 now abandoned.

FIELD OF THE INVENTION

The present invention relates to the preparation of ceramic membranes, and, in particular, relates to the reliable and successful production of both particulate and polymeric titanium ceramic membranes and coatings.

DESCRIPTION OF THE PRIOR ART

Ceramic membranes are used currently in industry and science for a variety of processes and purposes, the most common of which is separations. While organic membranes are most often used for separation processes, ceramic membranes have had increasing popularity because of several advantages which they offer over organic membranes. Ceramic membranes have a greater chemical stability since they are resistant to organic solvents, chlorine, and extremes of pH. Ceramic membranes are also stable at very high temperatures which allows for efficient sterilization of process equipment and pharmaceutical equipment often not possible with organic membranes. Because ceramic membranes are inorganic they are generally quite stable to microbial or biological degradation which can occasionally be a problem with organic membranes. Ceramic membranes are also mechanically very stable even under high pressures. The temperature, chemical, and mechanical stability of ceramic membranes allows them to be cleaned more effectively than other less durable membrane compositions.

The mechanism of operation and types of separations which can be achieved by ceramic membranes are discussed in general by Asaeda et al., Jour. of Chem. Eng. of Japan, 19:1, 72–77 (1986). At least one line of ceramic filters is currently on the market marketed under the trade name "Ceraflo" by the Norton Company of Worcester, Mass.

While many of these characteristics seem to favor inorganic membranes over organic membranes, the use of these membranes in widespread commercial applications has been slow because of the difficulty in producing crack-free membrane which have defined pore size and pore size distributions in desirable ranges. Some types of prior art inorganic membranes, such as the ultra-stabilized zirconia membranes made by depositing particles on a silica support are stable but have relatively large pore sizes which make them suitable only for very high molecular weight separations.

Significant effort has been extended in creating metal oxide membranes using aluminium. For example, it has been demonstrated that the use of sol-gel techniques allows the reproducible preparation of alumina ceramic membranes which may be supported or unsupported. Lenaars et al., Jour. of Membrane Science, 24, 261–270 (1985). By controlling various parameters of the process, it was demonstrated that reliable procedures can be developed for creating alumina ceramic membranes having relatively fine pores and a reliable size distribution of the pores.

The teachings in the art to date about the preparation of titania ceramic membranes have been limited. Most of the sol-gel teachings utilizing titanium have been aimed at preparing very thin particulate films because of their optical and corrosion resistance properties. However, the various parameters necessary for the reproducible and consistent preparation of these or similar films has not previously been rigorously described in such a fashion that they are readily replicable.

SUMMARY OF THE INVENTION

The present invention is summarized in that a process preparing either particulate or polymeric titania ceramic membranes includes the steps of preparing a colloidal solution containing a titanium organic salt with a specific ratio between water and titanium concentrations in the colloid so as to determine whether the resulting membrane is either particulate or polymeric, adding to the colloidal solution an alkyl alcohol, tightly controlling the pH of the colloid, and controlling the sintering temperature of the gel created from the colloid as it is sintered into a ceramic so as to prevent cracking of the resulting membrane.

The present invention is also summarized in that the teaching of the construction of an inorganic titanium polymeric membrane.

It is an object of the present invention to provide a method for reliably and reproducibly making both particulate and polymeric titanium ceramic membranes useful in a variety of applications and processes.

It is a further object of the present invention to define the parameters necessary for successful reproduction of this process.

It is another feature of the present invention in that the production of polymeric titanium films are created thereby providing an inorganic polymeric substance having potential utility for catalysis photocatalysis, adsorption filtering or other applications.

Other objects, advantages, and features of the present invention will become apparent from the following specification.

DETAILED DESCRIPTION OF THE INVENTION

The present invention is directed to the preparation of membranes of titanium oxides. There are two variations in the method as disclosed here. The first variation involves the gellation of a colloidal sol. This first variation utilizes a type of gel that is generally particulate but which can be formed in a coherent bulk if the processing variables are controlled carefully and can result in a consistent and uniform membrane after gellation. The second variation in this method involves the hydrolysis of an organometallic titanium compound to form a soluble intermediate compound which then condenses into the inorganic titanium polymer.

In general, the preparation of such titanium ceramic membranes proceeds through a sol-gel preparation procedure. A titanium alkoxide is dissolved in alcohol and hydrolysized, totally or partially with water. The hydrolysis and peptization (typically with $HNO_3$) results in a colloidal suspension, or sol. The sol is then evaporated to leave a semi-solid or gel. The gel may be formed on a substrate or formed in a self-supporting shape. The gel is sintered by firing at high temperature into a ceramic.

For both particulate and polymeric titanium membranes, both of which involve the preparation of sols and gels which are then fired to achieve ceramic materials, there are four distinct variables which must be carefully controlled. The first is the ratio of water to titanium in the colloidal formation so that the gel is properly formed. The second criteria is the proper selection of an alcohol solvent for the hydrolysis step. The third consideration is tight pH control of the colloidal mixture. The fourth consideration is an upper limit upon the sintering temperatures to which the resultant gels are exposed during firing.

For the formation of particulate membranes, the chemical reaction can be characterized as commencing with the hydrolysis of titanium organometallic compounds at room temperature. Thus a typical reaction is:

$$Ti(iso-OC_3H_7)_4 + 4H_2O \cdot Ti(OH)_4 + 4C_3H_7OH$$

The above reaction proceeds most favorably if the water is tightly constrained. Therefore, it is first appropriate to dissolve the titanium tetraisopropoxide in a non-aqueous solvent. It has been found that the most desirable solvents are organic alkyl alcohols different from the alkyl radical in the organometallic compound. Thus in the above example isopropanol may be utilized, but ethyl or methyl alcohol are preferred. Water may then be added in increments while the solution is stirred. The hydrolysis will therefore proceed under controlled conditions resulting in a titanium hydroxide precipitant.

The titanium hydroxide precipitant may then be peptized with appropriate amounts of $HNO_3$. This step converts the precipitant into a highly dispersed, stable, colloidal solution. If desired, the slurry may also be heated for a time period of up to twelve hours to hasten peptization. This suspension is allowed to slowly gel over time by water evaporation under constant relative humidity at room temperature. The result is a gel which may be solidified in a number of ways. The gel may be solidified onto a support, such as glass, by dipping the support into the gel, in which it is coated, and then drying and firing the gel coating on the support. The gel may be poured into suitable containers without supports as well. In either event, the resulting sol needs to be fired at the temperature not to exceed 500° C. to form the stable particulate membrane.

For the preparation of polymeric membranes, again the starting material which is convenient is titanium tetraisopropoxide or other similar alkoxide compounds of titanium. The polymeric network is to be formed by oxide bridges. Only some soluble species developed during partial hydrolysis of the metal alkoxide are useful for further polymerization. This creates a difficulty since these alkoxide intermediates tend to hydrolyze rapidly in excess water producing titanium hydroxide precipitant. Therefore the amount of water must be even more tightly controlled for polymeric membrane formation. The process thus begins by hydrolysis in a very small quantity of water in alcohol solution. Again, the alcohol should be selected to be an alkyl alcohol which is different in its radical from the radical in the organometallic beginning material. As stated, it is particularly important that titanium dioxide not be allowed to precipitate. Since $TiO_2$ particles are isoelectric at a pH of 5.8, lower pH values are appropriate. It has been found that holding the pH of the hydrolysis step to near 2 will prevent the $TiO_2$ from precipitating during hydrolysis formulation. This reaction may be characterized as follows:

$$Ti(OR)_4 + xH_2O \cdot Ti(OH)_x(OR)_{4-x} + xHOR$$

For partially hydrolyzed products in the above reaction, x will be less than 4. Such partially hydrolyzed products which are soluble in the alcohol medium will immediately condense to form polymeric chains through condensation of the oxygen bridges as follows:

$$Ti(OR)_y(OH)_x \cdot TiO_z(OR)_{y_1}(OH)_{x_1} + (y-y_1)ROH$$

In this reaction, $x_1$ is less than x, $y_1$ is less than y and z equals $(4-(x_1+y_1))/2$. In this fashion, a continuous inorganic polymer is formed of titanium atoms linked by the oxygen atoms.

The result of this polymeric process is a gel which forms as a distinct phase in the otherwise liquid medium, and which shrinks with time as it expels the excess liquid. If exposed to air, the alcohol solvent will evaporate rapidly causing the gel to crack as a result of rapid shrinkage. If the gelling time is allowed to proceed over several hours, a monolithic and crack-free gel will result. This gel can be fired at temperatures up to 500° C. without a resulting unacceptable number of cracks being formed. This polymeric gel membrane can also be formed on a ceramic or glass support or alternatively can be formed into a self-supporting membrane by deposition upon a surface or drying from a colloidal mix and later firing.

EXAMPLE 1

Colloidal Membrane

Colloidal $TiO_2$ sols having a composition of molar ratio $Ti/H_2O/H = 1/200/0.4$ were prepared in accord with the following instructions:

(1) 0.04 moles (11.9 ml) titanium tetraisopropoxide were placed into a dropping funnel and is mixed with 2 ml isopropanol already in the funnel. 8 moles (144 ml) Milli-Q water, which is water that has been ionized using a Milli-Q water purification system from Millipore Corporation, was separately placed into a round-bottom three-neck flask with a capacity of 250 ml.

(2) A hydrolysis device was set up by connecting the funnel which contained alkoxide with one of the three necks of the flask which is holding water. A second of the three necks of this flask was joined with a thermometer, and a third of the three necks of this flask was joined with a reflux condenser. Proper heating and stirring equipment must be installed before hydrolysis is to occur.

(3) Hydrolysis was carried out through rapid dropping of alkoxide from the funnel into the water within the flask, under the conditions of room temperature and violent stirring, thereby resulting in the precipitation of fine-particle slurry-like titanium hydroxide. When the addition of alkoxide from the funnel into the water in the flask was completed, the stirring was continued for another half hour to reach the equilibrium of the reaction.

(4) 0.016 moles (1.03 ml) concentrated nitric acid (70 wt %) was then added into the slurry using a micropipette in order to peptize the precipitate into colloidal suspension. The temperature was then raised up to 85°–95° C., while continuing to stir and reflux for 10–12 hours, which time is necessary for completing the peptizing.

(5) When the entire system is cooled down to room temperature, a stable colloidal $TiO_2$ sol was produced. The sols were then sintered at temperatures up to 500° C. to produce ceramic membranes.

Various other compositions of sol may be made using different amounts of alkoxide, water and acid in the recipe. The procedures outlined in steps 1–5 above may be followed using the amounts of alkoxide, water and acid shown in Table 1 below.

TABLE 1

| Composition ($Ti/H_2O/H$) molar ratio | Ti(iso-$C_3H_7O)_4$ (ml) | $H_2O$ (ml) | $HNO_3$ (ml) | pH (calculated) | pH (measured) |
|---|---|---|---|---|---|
| 1/200/0.2 | 11.9 | 144 | 0.514 | 1.29 | 1.35 |
| 1/200/0.4 | 11.9 | 144 | 1.029 | 0.99 | 1.12 |
| 1/200/0.7 | 11.9 | 144 | 1.801 | 0.75 | 0.93 |
| 1/200/1.0 | 11.9 | 144 | 2.572 | 0.60 | 0.87 |
| 1/300/0.1 | 5.9 | 108 | 0.129 | 1.75 | |
| 1/300/0.2 | 5.9 | 108 | 0.257 | 1.45 | |
| 1/300/0.5 | 5.9 | 108 | 0.643 | 1.06 | |
| 1/300/1.0 | 5.9 | 108 | 1.286 | 0.76 | |
| 1/300/1.2 | 5.9 | 108 | 1.543 | 0.68 | |

A series of hydrolysis and particle gel formation experiments were performed using a variety of pH levels and variations in the ratio between water concentration and titanium ion concentration. The results are summarized in Table 2 below.

TABLE 2

| No. | $H_2O/Ti$ (mole ratio) | $H^+/Ti$ (ratio) | $TiO_2$ (wt %) | Stability of Sol | Features of Solid Gel | *Weight Loss in Gellation |
|---|---|---|---|---|---|---|
| Group A | | | | | | |
| 1 | 200 | 0.08 | 2.0 | NP | good | |
| 2 | 200 | 0.2 | 2.0 | S | good | 97.66% |
| 3 | 200 | 0.4 | 2.0 | S | good | 97.62% |
| 4 | 200 | 0.7 | 2.0 | S | good | 97.61% |
| 5 | 200 | 1.0 | 2.0 | S | cracks present | 97.60% |
| 6 | 200 | 1.2 | 2.0 | NS | cracks present | |
| Group B | | | | | | |
| 1 | 300 | 0.1 | 1.3 | S | good | |
| 2 | 300 | 0.5 | 1.3 | S | good | |
| 3 | 300 | 1.0 | 1.3 | S | good | |
| 4 | 300 | 1.2 | 1.3 | S | good | |

S = Stable
NS = not stable, floccus appearance
NP — not peptized completely
*Weight loss from original sol to solid gel, given as a percentage of the original sol weight.

From the above data, it is evident that the stable titanium sols can be best achieved if the mole ratio of free hydrogen ions (from the acid) to titanium molecules is between 0.1 and 1.0. This range can be expanded only in relatively dilute sol solutions such as those of Group B on the table. The reason for this is not completely understood but may relate to the increased interparticle distance in the more dilute solutions making aggregation more difficult than in concentrated sols. Only stable sols could be properly transformed by evaporation into coherent transparent gels and thereafter into coherent titanium oxide membranes by protolysis.

The concentration of the acid was found to effect the gelling volume. The gelling volume goes through a minimum when the acid concentration is about 0.4 moles of free protons per mole of titanium. The sols lose at least 4.5% of their original weight, depending upon the electrolyte concentration, to arrive at the gelling point. The sols must lose some additional 97.6% of their original weight in order to form a final solid gel. Heating the final gels in the sintering process results in a further weight loss of about 13.5% without destroying the internal gel structure. Sintering temperatures in excess of 500° C. resulted in cracks in the resultant ceramics, but lower firing temperatures resulted in membranes with reasonably consistent porosity.

EXAMPLE 2

Polymeric Membranes

A series of experiments were performed testing the parameters of water to titanium ratio on the preparation and features of polymeric titanium membranes made in accordance with this procedure. One of the critical parameters was determined to be the relative concentrations of water in titanium in the colloidal solution. In addition to having a fixed limit on the ratio of water to titanium, it was also determined that the slow addition of the water, dissolved in alcohol, into a solution of titanium tetraisopropoxide dissolved in alcohol aided the success of the reaction. The need for the care in the amount of water and its slow addition arises from the tendency of the titanium alkoxide precursors to hydrolyze rapidly upon the addition of water producing titanium hydroxide which precipitates rapidly thereby not continuing to react with other molecules.

Polymeric $TiO_2$ sols were made having a composition with molar ration $T:H_2O:C_2H_5OH:H = 1:1:50:0.08$ in accord with the following instructions:

(1) 0.005 moles (1.5 ml) titanium tetraisopropoxide were mixed with one-half of the amount of the required 0.25 moles (13.7 ml) ethyl alcohol in a round-bottom three-neck flask with a capacity of 100 ml. 0.005 moles (0.09 ml) Milli-Q water was mixed separately with the other half of the ethyl alcohol in a small dropping funnel into which 0.0004 moles (26 microliter) concentrated nitric acid is then added using a micropipette.

(2) One of the three necks of the flask was then connected with the dropping funnel, while a second neck of the three-necked flask was connected with a thermometer. The third neck of the flask is connected with a reflux condenser. A magnetic stirrer was placed under the flask.

(3) All hydrolyzing and polycondensing processes were carried out at room temperature at a high speed stirring rate. The dropping of the water from the funnel into the alkoxide within the flask was controlled very carefully, with a speed of ten drops per minute, i.e. 0.28 ml/minute to keep the solution clear at all times during the reactions. After the addition of the water, the solution was continued to be stirred for a short time depending on how fast the gellation occured in the particular sol, generally less than 10 minutes.

(4) The transparent polymeric $TiO_2$ sol was finally removed to a well-closed bottle which was stored in a cold room in order to prevent the sol from gelling and to maintain the sol for ready use. The sols were fired at temperatures of 500° C. resulting in membranes which were polymeric and generally crack-free.

Polymeric $TiO_2$ sol having various molar compositions were made according to the above instructions, but with the amounts of material in the recipe varied in accordance with the following Table 3.

TABLE 3

| Composition (Ti:H₂O:C₂H₅OH:H molar ratio) | Ti(iso-C₃H₇O)₄ (ml) | H₂O (ml) | C₂H₅OH (ml) | HNO₃ (ul) |
|---|---|---|---|---|
| 1:1:50:0.08 | 1.5 | 0.09 | 14.7 | 26 |
| 1:2:50:0.08 | 1.5 | 0.18 | 14.7 | 26 |
| 1:4:50:0.08 | 1.5 | 0.36 | 14.7 | 26 |
| 1:8:50:0.08 | 1.5 | 0.72 | 14.7 | 26 |
| 1:16:50:0.08 | 1.5 | 1.44 | 14.7 | 26 |
| 1:1:8:0.08 | 4.5 | 0.27 | 7.0 | 77 |
| 1:2:8:0.08 | 4.5 | 0.54 | 7.0 | 77 |
| 1:1:8:0.025 | 4.5 | 0.27 | 7.0 | 24 |
| 1:1:8:0.08* | 4.5 | 0.27 | 9.2** | 77 |

*the ratio of Ti:H₂O:iso-propanol:H
**amount of isopropanol

A series of similar replications are summarized in Table 4 which indicates that successful polymeric membranes can be formed using initial ratios of water to titanium concentrations of up to 16 mole per mole.

TABLE 4

Composition and Properties of Polymeric TiO₂ Gel

| No. | H₂O/Ti (mole ratio) | C₂H₅OH/Ti (mole ratio) | H⁺/Ti (ratio) | TiO₂ (wt %) | Features of Gel or Sol |
|---|---|---|---|---|---|
| Group E | | | | | |
| 1 | 1 | 50 | 0.08 | 3% | clear gel |
| 2 | 2 | 50 | 0.08 | 3% | clear gel |
| 3 | 4 | 50 | 0.08 | 3% | clear gel |
| 4 | 8 | 50 | 0.08 | 3% | opaque gel |
| 5 | 16 | 50 | 0.08 | 3% | too viscous to form sol |
| 6 | 1 | 8 | 0.08 | 12% | clear gel |
| 7 | 2 | 8 | 0.08 | 12% | too viscous to form sol |
| 8 | 1 | 8 | 0.025 | 12% | clear gel |
| Group P | | | | | |
| 1 | 1 | *8 | 0.08 | 12% | opaque gel |

*ratio of iso-C₃H₇OH to Ti.

The analysis of the experimental data shown in Table 2 also indicates that water concentration in the initial solution controls the viscosity of the sol. The more water there is in proportion to titanium in the original solution the more viscous the solution becomes. The limits of polymeric sol formation appear to be approximately 16 mole of water per mole of titanium to 2 mole of water per mole of titanium, indicating a range, expressed in weight of $TiO_2$ of from 3 to 12%. Of the gels produced by these titanium sols, there appeared to be a transition when the mole of ratio of water to titanium was about 4. Above that level the gels are opaque while below that level the gels are transparent. The ratio of water concentration also had an effect upon gelling volume and gelling time. The experiments determining this criteria are summarized in Table 5 below.

TABLE 5

Influence of Water Concentration on Gellation Group G

| No. | H₂O/Ti (mole ratio) | C₃H₇OH/Ti (mole ratio) | H⁺/Ti (ratio) | Gelling Time (hrs) | Gelling Volume *(cm) |
|---|---|---|---|---|---|
| 1 | 1 | 28 | 0.025 | 19.5 | 1.8 |
| 2 | 1.5 | 28 | 0.025 | 14.5 | 1.85 |
| 3 | 2 | 28 | 0.025 | 11 | 1.9 |
| 4 | 2.5 | 28 | 0.025 | 5 | 1.95 |
| 5 | 3 | 28 | 0.025 | 4 | 2.0 |

TABLE 5-continued

Influence of Water Concentration on Gellation Group G

| No. | H₂O/Ti (mole ratio) | C₃H₇OH/Ti (mole ratio) | H⁺/Ti (ratio) | Gelling Time (hrs) | Gelling Volume *(cm) |
|---|---|---|---|---|---|
| 6 | 3.5 | 28 | 0.025 | 3.5 | 2.0 |
| 7 | 4 | 28 | 0.025 | 1.5 | 2.0 |

*Gelling volume is represented by the height of sample in vial at gelling point. The initial height was 2.05 cm for every sample.

The choice of alcohol solvent which dilutes the reacting species also appears to affect the rates of hydrolysis in polymerization. It was found that the preferred and most successful alcohols to be used were alkyl alcohols different from the radical used in the reacting species. Thus, using titanium tetraisopropoxide, an ethyl alcohol solvent was preferred. Again, maintenance of low "pH", preferably about 2, was necessary to prevent precipitation during hydrolysis.

The resulting titanium gels are quite different than other gels such as those formed by silicons. If titanium polymeric sols are placed in a closed container and aged for a time period of weeks, a monolithic crack-free gel forms and shrinks with time in the presence of expelled liquid. The sol thus evolves into a two-phase system, a crack-free gel, and the clearly separated expelled liquid phase.

The polymeric gels thus produced may be fired at temperatures up to 500° C. without cracking. Microscopic examination of the polymeric surface reveals a relatively uniform surface without cracks in these membranes. The membranes have been formed both on substrates and free standing. It has been found for sintering temperatures in excess of 500° C. that cracks and other forms of porosity develop in the membrane thereby weakening their integrity and uniformity.

It is understood that the invention is not confined to the particular materials, structures and processes set forth herein as illustrative, but embraces such modified forms thereof as come within the scope of the following claims.

We claim:

1. A method of preparing a polymeric titanium oxide ceramic membrane comprising the steps of:
    dissolving a titanium alkoxide in an alkyl alcohol wherein the alkyl alcohol has a different number of carbon atoms than the alkoxide radical;
    adding to the solution a very limited quantity of water while maintaining a pH of about two so that a colloidal solution is formed;
    solidifying the colloidal solution to obtain a gel; and
    sintering the gel by heating to a temperature no higher than about 500° C.

2. A method as claimed in claim 1 wherein the amount of water molecules is limited to less than 16:1 on a mole to mole ratio to titanium atoms in the solution.

3. A method as claimed in claim 1 wherein the initial alcohol solution also includes $HNO_3$ and wherein the rate at which water is added is limited so that substantially no titanium hydroxide precipitate is formed so that oxygen bridges between titanium atoms are formed so that the resulting membrane is a polymeric ceramic membrane.

4. A method as claimed in claim 3 wherein the titanium dioxide is between 3% and 12% by weight of the starting solution.

5. A method as claimed in claim 1 wherein the alkoxide is tetraisopropoxide and the alcohol is ethanol.

6. A method of preparing a particulate titanium oxide porous ceramic membrane comprising the steps of:
dissolving a titanium alkoxide in an alkyl alcohol at room temperature;
introducing the titanium alcohol solution into water at room temperature while stirring the suspension so as to result in a precipitate of fine titanium hydroxide particles in the suspension;
peptizing the suspension with nitric acid at room temperature to peptize the precipitate into colloidal suspension;
heating the suspension in the range of 85° to 95° C. for a time period sufficient to complete the peptizing of the suspension;
solidifying the gel by drying; and
sintering the solidified gel by heating to a temperature of no higher than about 500° C. to produce the porous titanium oxide ceramic membrane.

7. A method as disclosed in claim 6 wherein the pH of the suspension after the peptizing step is in the range of about 0.87 to 1.35.

8. A method as claimed in claim 6 wherein the ratio of the molar amounts of hydrogen atoms in the nitric acid to the molar amount of atoms of titanium in the suspension is between 0.1 and 1.0.

9. A method as claimed in claim 6 wherein the solidifying step comprises coating the gel on a support.

10. A method as claimed in claim 6 wherein the solidifying step comprises drying the gel without a support.

11. A method of preparing a particulate titanium oxide porous ceramic membrane comprising the steps of:
dissolving a titanium alkoxide in an alkyl alcohol;
introducing the titanium alcohol solution into water while stirring the solution, the amount of water sufficient so that the molar ratio of water molecules to titanium molecules in the suspension is in the range of 200 to 300 to one so as to result in a precipitate of fine titanium hydroxide particles in the suspension;
peptizing the suspension with nitric acid at a concentration of hydrogen ions from the acid to titanium of between 0.1 and 1.0 to peptize the precipitate into colloidal suspension;
heating the suspension in the range of 85° to 95° C. for a time period sufficient to complete the peptizing of the suspension;
solidifying the gel by drying; and
sintering the solidified gel by heating to a temperature of no higher that about 500° C. to produce the porous ceramic membrane.

12. A method as disclosed in claim 11 wherein the pH of the suspension after the peptizing step is in the range of about 0.87 to 1.35.

13. A method as claimed in claim 11 wherein the ratio of the molar amounts of hydrogen atoms in the nitric acid to the molar amount of atoms of titanium in the suspension is between 0.1 and 1.0.

14. A method as claimed in claim 11 wherein the solidifying step comprises coating the gel on a support.

15. A method as claimed in claim 11 wherein the solidifying step comprises drying the gel without a support.

* * * * *

UNITED STATES PATENT AND TRADEMARK OFFICE
CERTIFICATE OF CORRECTION

PATENT NO. : 5,096,745
DATED : March 17, 1992
INVENTOR(S) : Marc A. Anderson and Qunyin Xu It is certified that error appears in the above-identified patent and that said Letters Patent is hereby corrected as shown below:

Column 1,
Line 5, please delete the entire paragraph and insert therefor the following:
-- This invention was made with United States government support by the following agencies: EPA R813457-01-0, DOE DE-AS07-86ID12626, DOE AX0798826-1 and NSF OIR-8413387. The United States has certain rights in this invention. --

Signed and Sealed this

Thirteenth Day of July, 2004

JON W. DUDAS
*Acting Director of the United States Patent and Trademark Office*